United States Patent
Gudoshnikov et al.

(10) Patent No.: US 9,841,328 B2
(45) Date of Patent: Dec. 12, 2017

(54) MECHANICAL STRESS SENSOR HAVING A FERROMAGNETIC MICROWIRE

(71) Applicant: National University of Science and Technology "MISiS", Moscow (RU)

(72) Inventors: Sergey Alexandrovich Gudoshnikov, Moscow (RU); Boris Yakovlevich Liubimov, Moscow (RU); Nickolai Alexandrovich Usov, Kaluzhskaya obl. (RU); Andrey Sergeevich Ignatov, Moscow (RU); Vadim Petrovich Tarasov, Moscow (RU); Olga Nikolaevna Krivolapova, pgt Pravdinsky (RU)

(73) Assignee: NATIONAL UNIVERSITY OF SCIENCE AND TECHNOLOGY "MISIS", Moscow (RU)

( * ) Notice: Subject to any disclaimer, the term of this patent is extended or adjusted under 35 U.S.C. 154(b) by 0 days.

(21) Appl. No.: 15/103,157

(22) PCT Filed: Dec. 13, 2013

(86) PCT No.: PCT/RU2013/001119
§ 371 (c)(1),
(2) Date: Jun. 9, 2016

(87) PCT Pub. No.: WO2015/088372
PCT Pub. Date: Jun. 18, 2015

(65) Prior Publication Data
US 2016/0320253 A1 Nov. 3, 2016

(51) Int. Cl.
*G01L 1/00* (2006.01)
*G01L 1/22* (2006.01)
*G01L 1/12* (2006.01)

(52) U.S. Cl.
CPC .............. *G01L 1/125* (2013.01); *G01L 1/127* (2013.01)

(58) Field of Classification Search
None
See application file for complete search history.

(56) References Cited

U.S. PATENT DOCUMENTS

| | | | | |
|---|---|---|---|---|
| 4,184,093 A | * | 1/1980 | Sullivan | B06B 1/0688 310/331 |
| 5,159,347 A | * | 10/1992 | Osterwalder | H01Q 7/00 324/219 |

(Continued)

FOREIGN PATENT DOCUMENTS

| | | |
|---|---|---|
| RU | 2492459 C1 | 9/2013 |
| WO | 2007/116218 A1 | 10/2007 |
| WO | 2010/055282 A1 | 5/2010 |

OTHER PUBLICATIONS

International Search Report of PCT/RU2013/001119, dated Sep. 18, 2014.

*Primary Examiner* — Peter Macchiarolo
*Assistant Examiner* — Jermaine Jenkins
(74) *Attorney, Agent, or Firm* — Lambert & Associates; Gary E. Lambert; David J. Connaughton, Jr.

(57) ABSTRACT

The invention refers to measuring equipment and is a mechanical stress sensor. The sensor has a rectangular plate of a polymer material the top surface of said rectangular plate having a cavity where a detector is located. Inside the rectangular plate there is a preliminary tensile amorphous ferromagnetic microwire located inside a measuring coil. The microwire is connected to a first pair of contact pads, while the differential measuring coil is connected to a second pair of contact pads. Both pairs of contact pads are connected to the detector. The detector has an output which is connected to an analog to digital converter coupled with a personal computer.

11 Claims, 3 Drawing Sheets

(56) References Cited

U.S. PATENT DOCUMENTS

| | | | | |
|---|---|---|---|---|
| 5,195,377 | A * | 3/1993 | Garshelis | G01L 1/125 324/209 |
| 5,850,045 | A * | 12/1998 | Harada | G01L 3/102 73/779 |
| 6,747,559 | B2 * | 6/2004 | Antonenco | G08B 13/2408 148/300 |
| 6,894,256 | B2 * | 5/2005 | Balla | B29C 65/3656 156/379.6 |
| 7,852,215 | B2 * | 12/2010 | Marin Palacios | G08B 13/2411 235/385 |
| 7,913,569 | B2 * | 3/2011 | Girshovich | G01B 7/16 324/209 |
| 7,936,595 | B2 * | 5/2011 | Han | B82Y 25/00 257/421 |
| 7,953,562 | B2 * | 5/2011 | Bulte | G01L 1/125 702/42 |
| 8,168,120 | B1 * | 5/2012 | Younis | G01N 29/022 422/68.1 |
| 8,286,497 | B2 | 10/2012 | Clothier et al. | |
| 8,486,718 | B2 * | 7/2013 | Van Lankvelt | G01N 27/745 324/207.11 |

\* cited by examiner

MECHANICAL STRESS SENSOR HAVING A FERROMAGNETIC MICROWIRE

CROSS REFERENCE TO RELATED APPLICATIONS

This application is the National Stage of PCT/RU2013/001119 filed on Dec. 13, 2013, the disclosure of which is incorporated by reference. The international application under PCT article 21(2) was published in English.

FIELD OF THE INVENTION

This invention relates to technical diagnostics and non-destructive control of materials and can be used for the construction and operation of measuring devices, more specifically, mechanical stress sensors.

PRIOR ART

Known is a magnetoelastic sensor for measuring mechanical stresses in ferromagnetic materials (RU 2492459, published Sep. 10, 2013) comprising a case made from a conducting nonmagnetic material. The case has two cores installed on it: the main and the auxiliary cores in the form of two U-shaped magnetic conductors. The auxiliary core is installed symmetrically between the poles of the main core so that its plane is orthogonal to the plane of the main core. The main core has two windings connected in sequence. One winding is the exciting one and the other is the excitation control one. The auxiliary core has a measuring winding. The latter measures the magnetic noise generated by Barkhausen jumps caused by the switching of the controlled area. The magnitude of that noise is the basis for the mechanical stress estimation.

Disadvantages of this device are the large dimensions of the sensor and its suitability for mechanical stress measurement in ferromagnetic materials only.

Known are a method and a device for measuring physical parameters (WO 2007116218, published Oct. 18, 2007). The device for measuring physical parameters comprises a sensor based on amorphous ferromagnetic materials with a positive magnetostriction constant, an alternating magnetic field source, a detector of electromotive force expressed in the form of pulsed signals generated by enormous Barkhausen jumps caused by sensor switching. It is assumed that the magnitude of the magnetic noise is proportional to the mechanical stress applied. To detect the applied mechanical load, the sensor is in the form of a preliminary stressed amorphous ferromagnetic microwire.

Disadvantages of this device are the large scatter of sensor characteristics and the significant influence of external magnetic fields on its operation.

The prototype of the invention is the composite sensor (WO 2010055282, published May 20, 2010). Said composite stress sensor is made from a polymer matrix and reinforcing elements. The polymer matrix array comprises at least one layer of electrically conductive fabric. Said layer comprises at least one magnetically soft amorphous ferromagnetic microwire. The microwire conducts electric current, and the corresponding voltage on the microwire is measured. When mechanical load is applied to the material the microwire impedance may change due to the effect of giant magnetic impedance and the giant stress/impedance effect. The change in the impedance of the ferromagnetic microwire leads to the changes of the voltage readings.

Disadvantage of said device is the complexity of measuring local mechanical stresses as the sensor has an elongated shape and measures a signal that is proportional to all the mechanical loads acting on the entire length of the amorphous ferromagnetic microwire. Furthermore, due to the giant magnetic impedance effect the composite sensor may respond to applied external magnetic fields that will distort the net effect of the applied mechanical load.

DISCLOSURE OF THE INVENTION

The technical result achieved by the invention is an increase the sensor functionality by making it capable of measuring signals caused by local mechanical loads and detecting various types of mechanical loads, e.g. tension, compression and torsion, as well as reducing the effect of noise and increasing the sensitivity.

Said technical result is achieved as follows.

The mechanical stress sensor disclosed herein comprises a rectangular plate of a polymer material. The top surface of the rectangular plate has a seat in the form of a centrally symmetric cavity where the detector is located.

Inside the body of said rectangular plate, along the central longitudinal axis and parallel to the top and bottom planes, there is a magnetosensitive element based on a preliminary tensile amorphous ferromagnetic microwire.

Said magnetosensitive element is located inside a differential measuring coil and connected to the first pair of contact pads via printed conductors.

Said differential measuring coil is connected, via printed conductors, to the second pair of contact pads. Furthermore, both pairs of contact pads are located inside the cavity and connected to the detector.

The detector comprises an alternating current source, a direct current source and a measuring coil signal amplifier. The alternating current source is connected to the magnetic field source. The direct current source is connected to the first pair of contact pads. The measuring coil signal amplifier input is connected to the second pair of contact pads, and the measuring coil signal amplifier output is connected to an analog to digital converter coupled with a personal computer.

In a particular case said rectangular plate is made from a metacryl polymer base material.

Furthermore, said seat is in the form of a centrally symmetric rectangular cavity.

The alternating current source has a frequency in the 10 Hz-10 kHz range.

In a particular case the amorphous ferromagnetic microwire can be made from cobalt rich alloys having compositions, e.g. $Co_{67}Fe_{3.85}Ni_{1.45}B_{11.5}Si_{14.5}Mo_{1.7}$ or $Co_{71.8}Fe_{4.9}Nb_{0.8}Si_{7.5}B_{15}$.

Furthermore, said amorphous ferromagnetic microwire may have circular magnetic anisotropy or weakly helical magnetic anisotropy.

Also, said amorphous ferromagnetic microwire may have a length of within 20 mm.

In addition, said amorphous ferromagnetic microwire can be placed in a glass envelope.

Furthermore, said measuring coil is in the form of two differentially connected solenoids not greater than 0.5 mm in diameter and not longer than 7 mm each, made from windings of a copper wire not greater than 50 um in diameter.

Alternatively, said measuring coil can be made from two-layer thin-film planar solenoids.

In a particular case, the contact layer on the bottom surface of the matrix is a glue tape.

The functionality of the claimed sensor is expanded due to the following features of its design:

the capability of detecting various types of mechanical loads, e.g. tension, compression and torsion is achieved by the sensitive element being in the form of an amorphous ferromagnetic microwire with circular magnetic anisotropy and a magnetic method of the signal detection using a magnetic field source and a measuring coil, in contrast to the microwire impedance measurement used in the prototype.

local mechanical loads can be measured due to the small dimensions of the amorphous ferromagnetic microwire, i.e., 20 mm or less.

The sensor sensitivity to the magnetic noise is reduced by the differential connection of the measuring coil and the small dimensions of the amorphous ferromagnetic microwire, i.e., 20 mm or less.

The sensitivity of the sensor is increased by the choice and use of an amorphous ferromagnetic microwires with circular or weakly helical magnetic anisotropy having small anisotropy fields and nearly linear magnetization curves, as well as by the use of an additional direct current source that stabilizes the circular magnetic structure of the microwire.

EMBODIMENTS OF THE INVENTION

The invention will now be explained by the following drawing.

Figure 4:
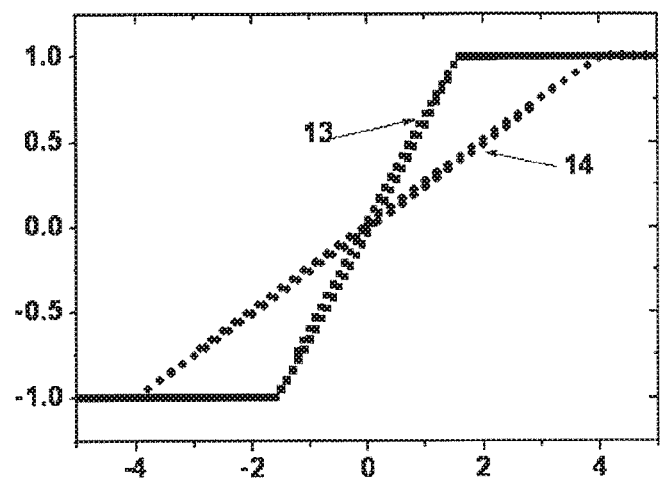

FIG. 4 presents the magnetization curves for tension stresses and

Figure 5:
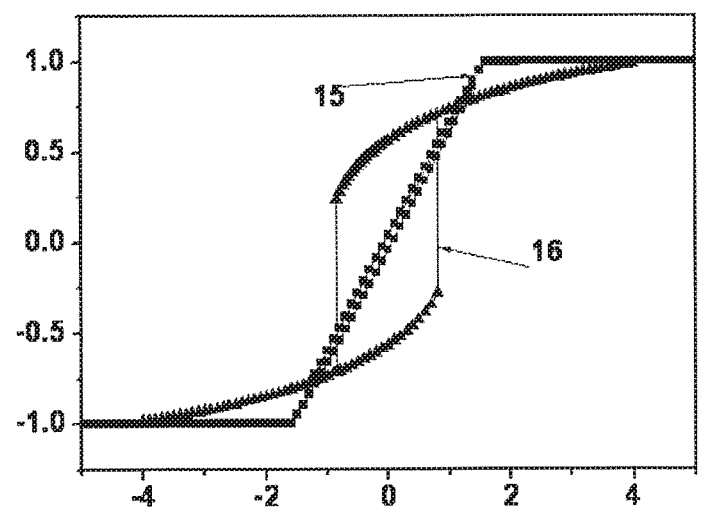

FIG. 5 presents the hysteresis loops for torsion stresses.

Figure 1:
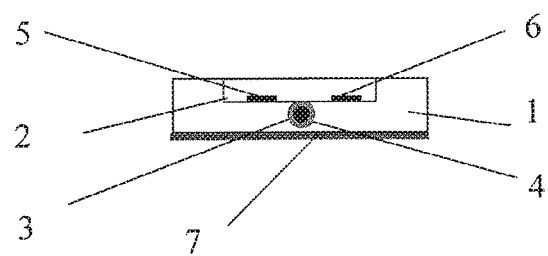
FIG. 1 shows a cross-section of the sensor.
Figure 2:
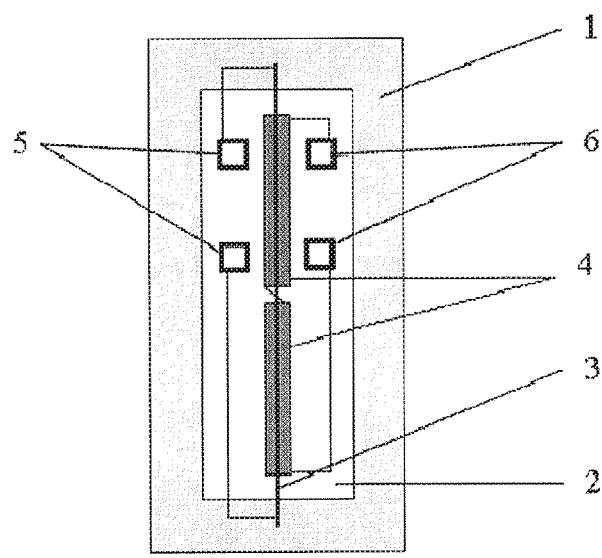
FIG. 2 shows a top view of the sensor structure.
Figure 3:
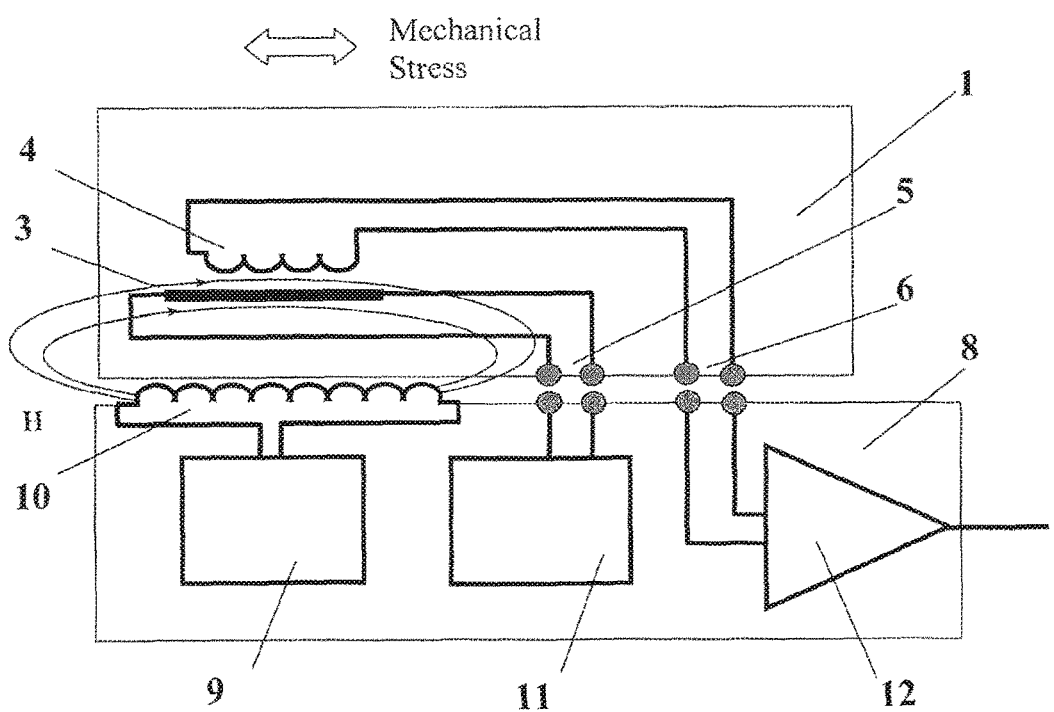
FIG. 3 shows the electrical diagram of sensor connection to the detector.

FIGS. 1, 2 and 3 show the rectangular plate 1, the seat 2, the amorphous ferromagnetic microwire 3, the differential measuring coil 4, the first pair of contact pads 5, the second pair of contact pads 6, the contact layer 7, the detector 8, the alternating current source 9, the magnetic field source 10, the direct current source 11 and the amplifier 12.

FIGS. 4 and 5 show plots wherein the X-axes show magnetic field in Oersteds and the Y-axes show the reduced magnetization of the amorphous ferromagnetic microwire.

In FIG. 4, curve 13, is the magnetization curve of the unloaded amorphous ferromagnetic microwire, and curve 14 is the magnetization curve of the amorphous ferromagnetic microwire under tension stress.

In FIG. 5, curve 15, is the hysteresis loop of the amorphous ferromagnetic microwire under torsion stress.

The mechanical stress sensor comprises the metacryl polymer base rectangular plate 1. The choice of this class of polymers is determined by its wide range of mechanical parameters encompassing the respective ranges of caoutchoucs and plastics, high plasticity and impact toughness, operation temperatures of up to 300° C., up to 90% light transmission, resistance to chemicals, capability of recycling by extrusion, casting and pneumatic forming, as well as mechanical processing to the required shape of the piece.

The rectangular plate 1 may have 10×20×2.5 mm dimensions. The top surface of the rectangular plate 1 has the seat 2 in the form of a centrally symmetric cavity. The seat 2 may have 6×16×0.5 mm dimensions. The seat 2 is located symmetrically relative to the magnetosensitive element.

The seat 2 accommodates the detector 8. The detector 8 comprises the alternating current source 9, the magnetic field source 10, the direct current source 11, the feeding microwire 3 and the amplifier 12 of signals of the differential measuring coil 4. The alternating current source 9 having a frequency in the 10 Hz-10 kHz range is connected to the magnetic field source 10 generating a uniform magnetic field oriented along the magnetosensitive element. The input of the amplifier 12 is connected to the second pair of the contact pads 6 of the measuring coil 4, and its output is connected to an analog to digital converter. The analog to digital converter is coupled with a personal computer.

Inside the body of said rectangular plate 1, along the central longitudinal axis and parallel to the top and bottom planes, there is a magnetosensitive element. It is in the form of the microwire 3 located inside the differential measuring coil 4. The microwire 3 is connected to the first pair of contact pads 5 via printed conductors. The first pair of contact pads 5 is located inside the seat 2 and connected to the direct current source 11 of the detector 8.

The glass-coated microwire 3 is made from the $Co_{67}Fe_{3.85}Ni_{1.45}B_{11.5}Si_{1.45}Mo_{1.7}$ alloy. The choice of the microwire is due to its specific type of magnetic anisotropy and inherent sensitivity to applied mechanical stress. Preliminary tensile stress may be applied to the microwire which contributes to the registration of compressive stress.

It is well known that in cobalt rich glass-coated amorphous ferromagnetic microwires with low negative magnetostriction constant, the residual quenching stresses produce circular magnetic anisotropy and circular magnetization of the microwire in its ground state. The microwires with circular anisotropy have almost linear magnetization curves in longitudinal magnetic fields, and show little hysteresis and low anisotropy fields. The application of tension stresses to such microwires causes proportional stretching of the magnetization curve. It increases the anisotropy field and hence reduces the steepness of the magnetization curve. This effect is illustrated by the behavior of curves 13 and 14 in FIG. 4.

The application of torsion stress to such microwires causes the hysteresis of the switching curve and changes the microwire coercive force. This effect is illustrated by the behavior of curves 15 and 16 in FIG. 5.

In real cobalt rich glass-coated amorphous ferromagnetic microwires, circular anisotropy can be accompanied by a weak helical anisotropy. The latter causes small hysteresis of the microwire magnetization curve and affects its linearity. This effect can be eliminated or reduced by creating an additional circular magnetic field of direct current flowing through the microwire using the direct current source 12 that feeds the microwire 3.

The differential measuring coil 4 is in the form of two differentially connected solenoids not greater than 0.5 mm in diameter and not longer than 7 mm each, made from windings of a copper wire not greater than 50 um in diameter. The differential measuring coil 4 is connected, via the printed conductors, to the second pair of contact pads 6. The contact pads 6 are located inside the seat 2 and connected to the amplifier 13 of the detector 9.

The contact layer 7 is applied onto the bottom surface of the plate 1. The contact layer 7 is, for example, in the form of a Scotch 9485/9482 sticky tape.

The sensor may not comprise the glue layer 7. In this case the detector is mounted onto the target object surface with SS-33A glue.

The sensor operates as follows.

The mechanical stress sensor is mounted on the surface of the target object with the layer 7 applied onto the bottom. When mechanical stresses are applied to the target object, e.g. tension, compression or torsion, the preliminary tensile amorphous ferromagnetic wire is also strained and its magnetization curve changes, as illustrated in FIGS. 4 and 5. For detecting changes in the magnetization curve the microwire 3 is exposed to an alternating magnetic field generated by the alternating current source 10 and the magnetic field source 11.

The alternating magnetic field with a frequency in the 10 Hz-10 kHz range and an amplitude of the order of that for the microwire 3 anisotropy field is uniform in the area of the microwire 3 and directed along its axis. The applied magnetic field switches the magnetization of the microwire 3 and produces an electromotive force signal on the differential measuring coil 4.

In the absence of mechanical stress, the amplitude of the electromotive force on the coil 4 is fixed. The application of compressive stress increases the amplitude of the signal of the electromotive force in the coil 4. The application of tensile stress reduces the amplitude of the signal of the electromotive force in the coil 4, due to reducing the slope of the magnetization curve. The application of torsional stress leads to changes in the waveform of the electromotive force in the coil 4 due to changing the shape of the magnetization curve.

In the suggested configuration, the magnetic field of the magnetic field source 11 switches the magnetization of the microwire 3 and, on the other hand, directly affects the differential measuring coil 4. In the two opposite solenoids of the differential measuring coil 4, the signal generated by the source 11 is a uniform magnetic field producing an electromotive force. These signals will have the same sign in each of the solenoids. Thus, due to the opposite connection of the solenoids, these signals will be subtracted from each other. The situation is, however, different for the switching signals produced by the microwire 3. Each coil is exposed to a specific section of the microwire 3, and therefore each section will induce its own signal. These signals will have opposite signs in the coils. Therefore, due to the opposite connection of the solenoids these signals will add.

For measurements over a large surface area of the target object the mechanical stress sensors are arranged in the desired points of the tested surface.

The sensor claimed herein has improved parameters of the magnetosensitive element in the form of an amorphous ferromagnetic microwire due to the direct current flowing through the microwire and optimized excitation of the magnetosensitive element due to its exposure to a longitudinal alternating magnetic field applied along the microwire axis. Besides, the detection of the amorphous ferromagnetic microwire response is obtained using a differential measuring coil.

Furthermore, the sensor provides the local stress measurement and has a noise measurement protection due to the use of a small-sized magnetosensitive element and the differential connection of the measuring coil.

What is claimed is:

1. Mechanical stress sensor disclosed herein comprising a rectangular plate of a polymer material the top surface of said rectangular plate having a seat in the form of a centrally symmetric cavity where a detector is located, wherein inside the body of said rectangular plate, along the central longitudinal axis and parallel to the top and bottom planes, there is a magnetosensitive element in the form of a preliminary tensile amorphous ferromagnetic microwire located inside a differential measuring coil and connected to a first pair of contact pads via printed conductors, said differential measuring coil being connected, via printed conductors, to a second pair of contact pads, further wherein both pairs of contact pads are located inside the seat and connected to the detector comprising an alternating current source connected to a magnetic field source, a direct current source connected to the first pair of contact pads and a measuring coil signal amplifier whose input is connected to the second pair of contact pads and output is connected to an analog to digital converter coupled with a personal computer.

2. Sensor of claim 1 wherein said polymer plate is made on the basis of metacryl polymers.

3. Sensor of claim 1 wherein said seat is in the form of a centrally symmetric rectangular cavity.

4. Sensor of claim 1 wherein said alternating current source has a frequency in the 10 hZ-10 kHz range.

5. Sensor of claim 1 wherein said amorphous ferromagnetic microwire is made from cobalt rich alloys having the compositions $Co_{67}Fe_{3.85}Ni_{1.45}B_{11.5}Si_{14.5}Mo_{1.7}$ or $Co_{71.8}Fe_{4.9}Nb_{0.8}Si_{7.5}B_{15}$.

6. Sensor of claim 1 wherein said amorphous ferromagnetic microwire has circular magnetic anisotropy or weak helical magnetic anisotropy.

7. Sensor of claim 1 wherein said amorphous ferromagnetic microwire has a length of within 20 mm.

8. Sensor of claim 1 wherein said amorphous ferromagnetic microwire is placed in a glass envelope.

9. Sensor of claim 1 wherein said measuring coil is in the form of two differentially connected solenoids not greater than 0.5 mm in diameter and not longer than 7 mm each, made from windings of a copper wire not greater than 50 um in diameter.

10. Sensor of claim 1 wherein said measuring coil is in the form of two layer thin-film planar solenoids.

11. Sensor of claim 1 wherein said contact layer on the bottom surface of the matrix is a glue tape.

* * * * *